United States Patent
Cho et al.

(10) Patent No.: US 8,050,282 B2
(45) Date of Patent: Nov. 1, 2011

(54) UNIVERSAL PLUG AND PLAY DEVICE AND METHOD OF RESOLVING NETWORK ADDRESS CONFLICT BY CONSIDERING REMOTE ACCESS

(75) Inventors: Seong-ho Cho, Seoul (KR); Se-hee Han, Seoul (KR); Je-young Maeng, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 286 days.

(21) Appl. No.: 12/411,717

(22) Filed: Mar. 26, 2009

(65) Prior Publication Data

US 2009/0245266 A1    Oct. 1, 2009

Related U.S. Application Data

(60) Provisional application No. 61/040,784, filed on Mar. 31, 2008.

(30) Foreign Application Priority Data

Sep. 1, 2008 (KR) .................. 10-2008-0085910

(51) Int. Cl.
   *H04L 12/28* (2006.01)
   *G06F 15/16* (2006.01)
(52) U.S. Cl. ........................ 370/401; 709/219
(58) Field of Classification Search .............. None
   See application file for complete search history.

(56) References Cited

U.S. PATENT DOCUMENTS

| | | | |
|---|---|---|---|
| 6,625,124 B1 * | 9/2003 | Fan et al. | 370/235 |
| 6,643,269 B1 * | 11/2003 | Fan et al. | 370/254 |
| 6,717,956 B1 * | 4/2004 | Fan et al. | 370/477 |
| 7,003,581 B1 * | 2/2006 | Lamberton et al. | 709/238 |
| 7,162,529 B2 * | 1/2007 | Morishige et al. | 709/230 |
| 7,505,418 B1 * | 3/2009 | Liang et al. | 370/249 |
| 7,729,366 B2 * | 6/2010 | Mok et al. | 370/401 |
| 7,830,878 B2 * | 11/2010 | Furukawa | 370/389 |
| 2004/0066788 A1 * | 4/2004 | Lin et al. | 370/401 |
| 2004/0071148 A1 * | 4/2004 | Ozaki et al. | 370/401 |
| 2005/0018665 A1 * | 1/2005 | Jordan et al. | 370/388 |
| 2006/0031459 A1 | 2/2006 | Ahn et al. | |
| 2007/0066338 A1 | 3/2007 | Lee et al. | |
| 2007/0081530 A1 * | 4/2007 | Nomura et al. | 370/389 |
| 2009/0327496 A1 * | 12/2009 | Klemets et al. | 709/227 |

FOREIGN PATENT DOCUMENTS

| KR | 10-2004-0005464 A | 1/2004 |
|---|---|---|
| KR | 10-2007-0037931 A | 4/2007 |

* cited by examiner

*Primary Examiner* — Gregory Sefcheck
(74) *Attorney, Agent, or Firm* — Sughrue Mion, PLLC

(57) ABSTRACT

A Universal Plug and Play (UPnP) device and method of resolving a network address conflict by considering remote access. In the method, a UPnP remote access server (RAS) in a home network selects a virtual network address in the home network that is accessible by a remote device on a remote network and that does not conflict with a network address in the remote network, and converts an address of a packet transmitted from the home network to the remote network based on the virtual network address.

28 Claims, 8 Drawing Sheets

UNIVERSAL PLUG AND PLAY DEVICE AND METHOD OF RESOLVING NETWORK ADDRESS CONFLICT BY CONSIDERING REMOTE ACCESS

CROSS-REFERENCE TO RELATED APPLICATIONS

This application claims priority from U.S. Provisional Patent Application No. 61/040,784, filed on Mar. 31, 2008, in the U.S. Patent and Trademark Office, and from Korean Patent Application No. 10-2008-0085910, filed on Sep. 1, 2008, in the Korean Intellectual Property Office, the disclosures of which are incorporated herein in their entireties by reference.

BACKGROUND

1. Field

One or more embodiments relate to a Universal Plug and Play (UPnP) device and a method of resolving a network address conflict by considering remote access, and more particularly, to a UPnP device and a method of resolving a network address conflict and providing a remote access service from a remote network to a home network even when a conflict occurs between a network prefix of the home network and a network prefix of the remote network.

2. Description of the Related Art

Due to the development of home networks, an existing personal computer (PC)-centered network environment in the home has expanded into a network environment that includes electronic devices using various lower network technologies. In this regard, there is a necessity to develop a technology that can connect the electronic devices in a unified network system by using the Internet Protocol (IP). Thus, a Universal Plug and Play (UPnP) technology has been developed. The UPnP Device Architecture 1.0 standard is based on a distributed and open networking architecture, and allows peer-to-peer networking of each electronic device in a home network, without the need for central administration.

Discovery of a UPnP device according to the UPnP Device Architecture 1.0 standard is based on the distributed and open networking architecture using IP multicast in a home network. However, IP multicast service is not guaranteed over the Internet so it is not possible to control a UPnP device via the Internet by using information obtained from the UPnP device discovery.

Thus, UPnP remote access architecture has been developed to enable a UPnP apparatus or a control point (CP) to operate as if the UPnP apparatus or the CP exists in a same physical network even when the UPnP device or the CP is located away from the home network. The UPnP remote access architecture defines a remote access server (RAS) existing in a home network, and a remote access client (RAC) existing in a remote network.

SUMMARY

One or more embodiments include a Universal Plug and Play (UPnP) device and a method of resolving a network address conflict and providing a remote access service from a remote network to a home network.

Additional aspects will be set forth in part in the description which follows and, in part, will be apparent from the description, or may be learned by practice of the invention.

To achieve the above and/or other aspects, one or more embodiments may include a communication method performed by a UPnP remote access server (RAS) in a home network, the communication method including the operations of selecting a remote accessible virtual home network address that does not conflict with a remote network address and cross-converting the remote accessible virtual home network address and a home network address, which are in a packet that is exchanged between a remote network and the home network.

The operation of selecting the remote accessible virtual home network address may include the operations of transmitting a conflict/non-conflict query message to a UPnP device in the remote network, wherein the conflict/non-conflict query message is related to whether the remote network address conflicts with the remote accessible virtual home network address to be selected by the UPnP RAS, receiving a conflict/non-conflict response message from the UPnP device in the remote network, and selecting the remote accessible virtual home network address according to a conflict/non-conflict result in the conflict/non-conflict response message.

The conflict/non-conflict query message may include a network prefix and a network prefix length corresponding to the remote accessible virtual home network address.

The conflict/non-conflict result may correspond to either a conflict existence or a conflict non-existence.

If the conflict/non-conflict result corresponds to a conflict non-existence, the communication method may further include the operation of generating a mapping table entry with respect to the remote accessible virtual home network address and the home network address that is allocated to a local area network (LAN) interface of the UPnP RAS.

The remote accessible virtual home network address, the home network address that is allocated to the LAN interface of the UPnP RAS, and the remote network address may include a network prefix and a network prefix length.

If the conflict/non-conflict result corresponds to a conflict existence, the communication method may further include the operation of re-transmitting the conflict/non-conflict query message using another remote accessible virtual home network address.

The conflict/non-conflict query message and the conflict/non-conflict response message may be generated using an out-of-band protocol message or a UPnP action message.

The operation of cross-converting may include the operations of converting the home network address of a protocol message of an application layer into the remote accessible virtual home network address, converting a source address of an outbound Internet Protocol (IP) packet transmitted from the home network to the remote network into a network prefix that corresponds to the remote accessible virtual home network address, and converting a destination address of an inbound IP packet transmitted from the remote network to the home network into a network prefix that corresponds to the home network address that is allocated to the LAN interface of the UPnP RAS.

To achieve the above and/or other aspects, one or more embodiments may include a communication method performed by a UPnP device in a remote network, the communication method including the operations of receiving a conflict/non-conflict query message from a RAS, determining whether a remote accessible virtual home network address conflicts with a remote network address, and transmitting a conflict/non-conflict response message having a result of the conflict/non-conflict determination to the RAS.

The operation of determining may include the operation of determining the equality of a network prefix of the remote accessible virtual home network address and a network prefix of the remote network address by comparing both network prefixes from the first bit to a shorter network prefix length bit, wherein the shorter network prefix length is determined to be a shorter length from among the network prefix length corresponding to the remote accessible virtual home network address to be selected by the UPnP RAS, which is included in the conflict/non-conflict response message, and the network prefix length corresponding to the remote network address.

If the result of the conflict/non-conflict determination corresponds to a conflict non-existence, the communication method may further include the operation of generating a table entry having the remote accessible virtual home network address of the RAS.

The UPnP device in the remote network may be one of a UPnP remote access client (RAC) and a UPnP RAS.

To achieve the above and/or other aspects, one or more embodiments may include a computer readable recording medium having recorded thereon a program for causing a computer to execute the communication method.

To achieve the above and/or other aspects, one or more embodiments may include a UPnP RAS in a home network, the UPnP RAS including a virtual home network address selecting unit that selects a remote accessible virtual home network address that does not conflict with a remote network address and a converting unit cross-converting the remote accessible virtual home network address and a home network address, which are in a packet that is exchanged between a remote network and the home network.

To achieve the above and/or other aspects, one or more embodiments may include a UPnP device in a remote network, the UPnP device including a query message receiving unit that receives a conflict/non-conflict query message from a RAS, a determination unit that determines whether a remote accessible virtual home network address conflicts with a remote network address, and a response message transmitting unit that transmits a conflict/non-conflict response message having a result of the conflict/non-conflict determination to the RAS.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
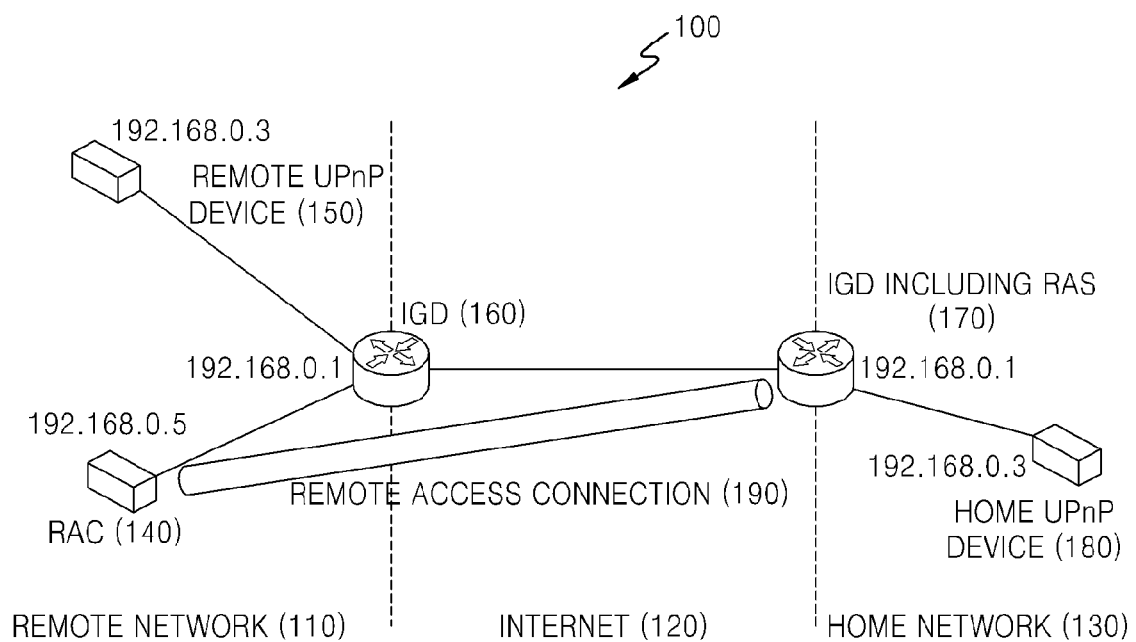
FIG. 1 illustrates a typical remote access architecture in which a network address conflict occurs when a remote access client (RAC) performs a remote access connection.

Reference will now be made in detail to exemplary embodiments, examples of which are illustrated in the accompanying drawings, wherein like reference numerals refer to the like elements throughout. In this regard, the present embodiments may have different forms and should not be construed as being limited to the descriptions set forth herein. Accordingly, the exemplary embodiments are merely described below, by referring to the figures, to explain aspects of the present description.

FIG. 1 illustrates a typical remote access architecture 100 in which a network address conflict occurs when a remote access client (RAC) 140 obtains a remote access connection 190 from a remote network 110 to a home network 130 over the Internet 120 using Internet Gateway Devices (IGDs) 160, 170. In the case where a remote network 110 that is connected with the RAC 140 uses a network prefix (e.g., 192.168.0.x), which is the same as that of a home network 130, a network address of a Universal Plug and Play (UPnP) device (e.g., a device 150 of FIG. 1) in the remote network 110 may conflict with a network address of a UPnP device (e.g., a device 180 of FIG. 1) in the home network 130 such that a remote access service may not be provided.

Figure 2:
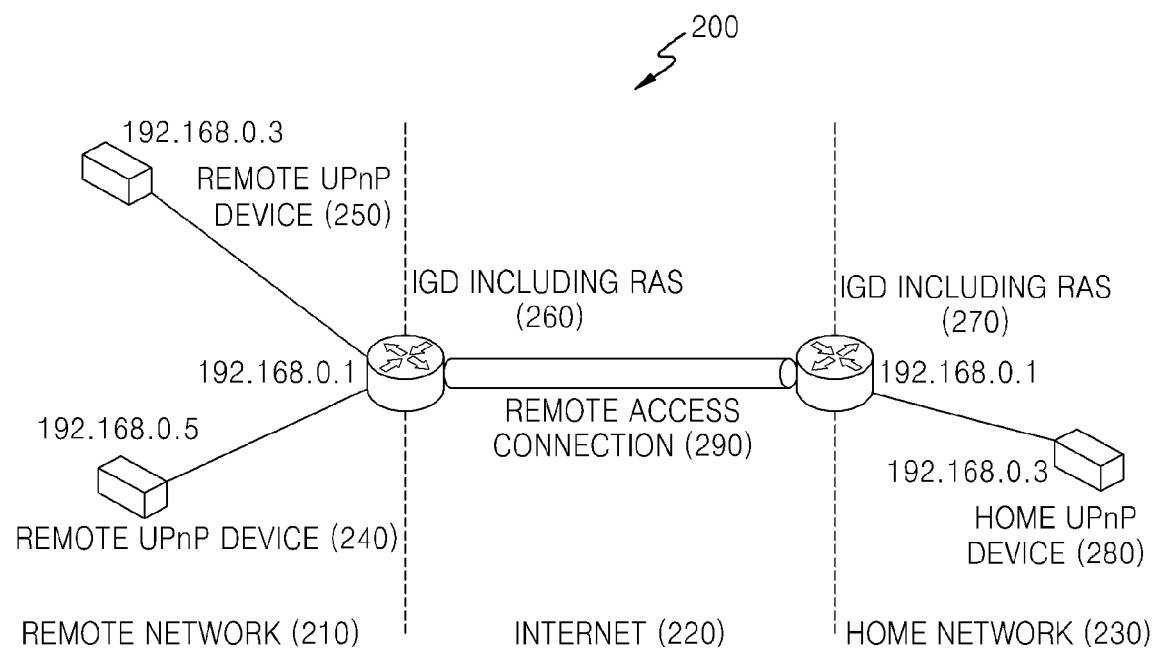
FIG. 2 illustrates a typical remote access architecture in which a network address conflict occurs when a remote access server (RAS) performs a remote access connection.

FIG. 2 illustrates a typical remote access architecture 200 in which a network address conflict occurs when a remote access server (RAS) obtains a remote access connection 290 from a remote network 210 having remote UPnP devices 240, 250 to a home network 230 over the Internet 220. The typical remote access architecture of FIG. 2 connects an RAS 270 of a home network 230 and an RAS 260 of a remote network 210 via one virtual private network (VPN) tunnel, thereby providing a remote access service. However, in the case where the remote network 210 that is connected with the RAS 260 uses a network prefix (e.g., 192.168.0.x) which is the same as that of the home network 230, a network address of a UPnP device (e.g., a device 250 of FIG. 2) in the remote network 210 may conflict with a network address of a UPnP device (e.g., a device 280 of FIG. 2) in the home network 230 such that the remote access service may not be provided.

Figure 3:
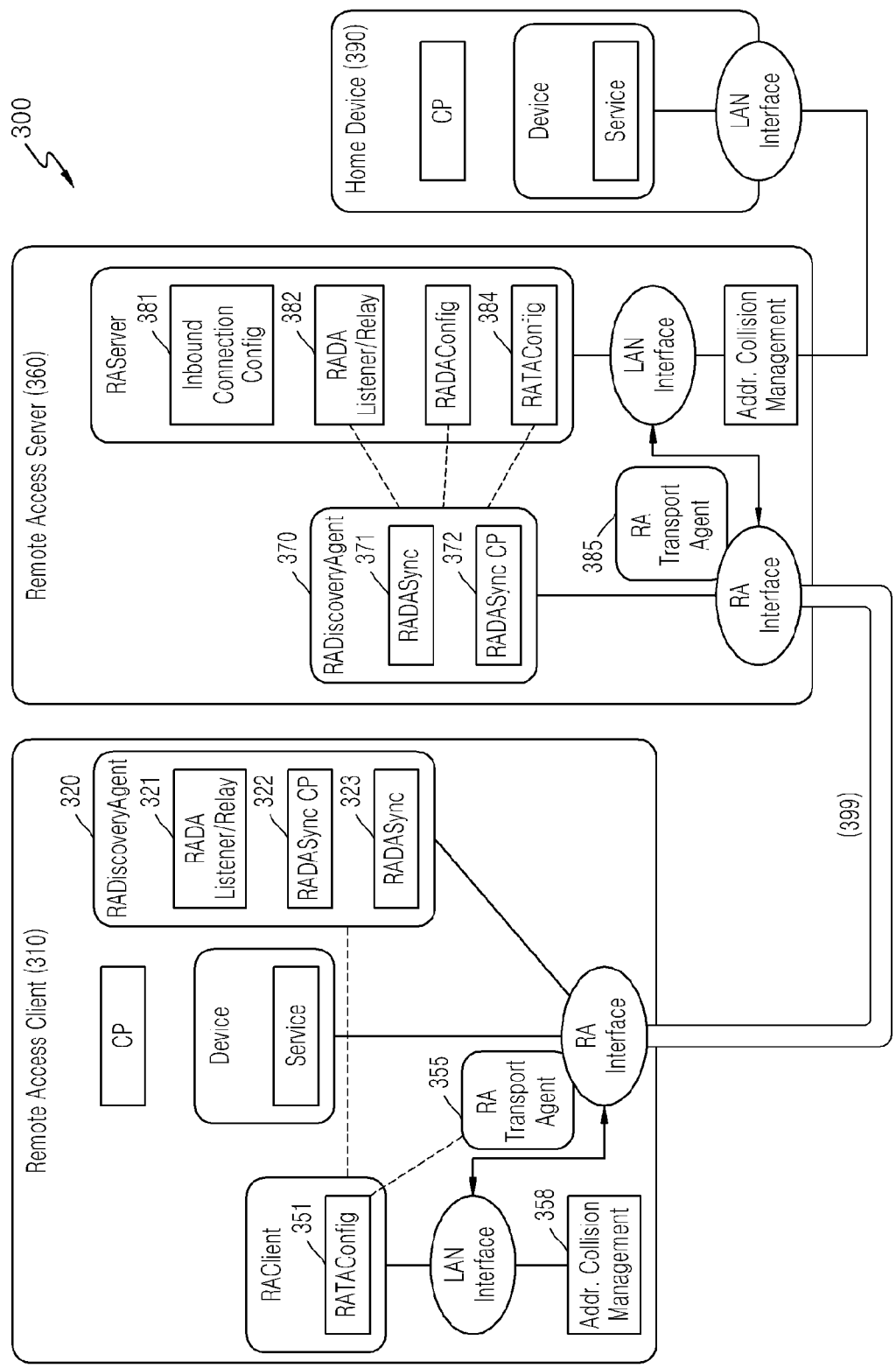
FIG. 3 illustrates a remote access architecture for resolving a network address conflict according to an exemplary embodiment.

FIG. 3 illustrates a remote access architecture 300 for resolving a network address conflict according to an embodiment. Hereinafter, structures of an RAC 310 and an RAS 360 illustrated in FIG. 3 will be described, and in particular, address conflict control modules 358 and 388 will be described in detail.

The RAS 360 and a home device 390 are UPnP devices existing in a home network, and the RAC 310 is a remote UPnP device located in a remote network that is away from the home network.

Remote access transport agents (RATAs) 355 and 385 provide a secure communication channel between the RAC 310 and the RAS 360. In general, a VPN tunnel is used to implement such a secure communication channel.

Parameters required to set a remote access transport channel (RATC) 399 are provided from a management console (not shown) that uses RATAConfig 351 and 384. The RATAConfig 351 and 384 are services provided from the RAC 310 and the RAS 360, and the management console (not shown) is a control point (CP) that includes a user interface.

In general, access via an RATA is initiated by a remote device such as the RAC 310. Thus, the RAS 360 in the home network has to be discovered and reached via the Internet. An InboundConnectionConfig 381 is a service providing an interface that enables a network manager to configure settings which are required to establish the RATC 399 between the RAC 310 and the RAS 360.

Remote access discovery agents (RADAs) 320 and 370 perform a discovery operation in a UPnP network and synchronize a network image between the home network and a remote network. Here, the network image is related to a device list including devices discovered in the home network. The synchronization of the network image means that, after the discovery operation, devices and services discovered by the RAS 360 are respectively synchronized with devices and services recognized by the RAC 310. For this synchronization, the RADA 320 and 370 respectively define a logical function module referred to as a RADA Listener/Relay 321 and 382.

The RADA Listener 382 monitors a Simple Service Discovery Protocol (SSDP) message so as to provide information about a device to the RADA 370 when the device joins or leaves the home network. The RADA Relay 321 functions to relay a periodic SSDP announcement message, a device expiration message, a multicast event message due to an image change, and the like to the home network where the RADA Relay 321 belongs. Also, the RADA Relay 321 responds to an SSDP Query (M-Search) from a device in the home network, where the SSDP Query is related to a device in the remote network.

When a new device or a new service is added to the home network, a RADA Sync CP 372 of the RAS 360 transmits the new device or the new service to the RAC 310 by using an AddRemoteDevice( ) action that is provided from a RADA Sync service 323 of the RAC 310, thereby synchronizing the network image with the RAC 310, or vice versa. In other words, when a new device or a new service is added to the remote network, the network image is synchronized with the RAS 360.

The address conflict control modules 358 and 388 of the RAC 310 and the RAS 360 perform a peer-to-peer communication, thereby preventing a network prefix conflict between the home network and the remote network from occurring. To accomplish this, the RAS 360 performs a query/response communication with the RAC 310, and allocates a remote accessible home network address that does not conflict with a remote network address. That is, in order to prevent the conflict from occurring, the RAS 360 functions to convert a network address with respect to an outbound packet that is transmitted from a device in the home network to the remote network, or with respect to an inbound packet that is transmitted from the remote network to a device in the home network.

Figure 4:
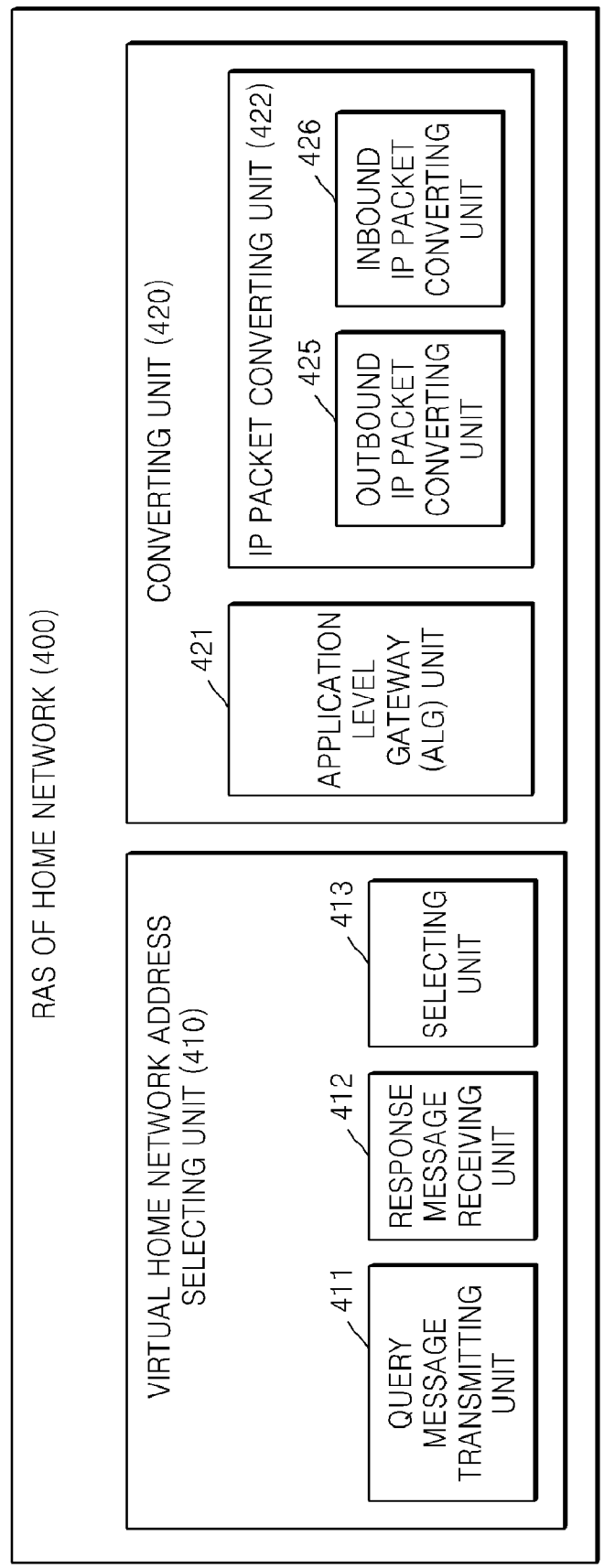
FIG. 4 is a block diagram of a structure of a RAS in a home network according to an exemplary embodiment.

FIG. 4 is a block diagram of a structure of a RAS 400 in a home network according to an embodiment. An address conflict control module 388 of the RAS 400 includes a virtual home network address selecting unit 410 and a converting unit 420. The virtual home network address selecting unit 410 queries whether a remote network address conflicts with a remote accessible virtual home network address to be selected by the RAS 400, and allocates a conflict-free remote accessible virtual home network address to the RAS 400. To be more specific, the virtual home network address selecting unit 410 includes a query message transmitting unit 411, a response message receiving unit 412, and a selecting unit 413.

The query message transmitting unit 411 transmits a conflict/non-conflict query message to a RAC, where the conflict/non-conflict query message is related to whether a remote network address conflicts with a remote accessible virtual home network address to be allocated to the RAS 400. The remote accessible virtual home network address includes a network prefix and a network prefix length. The network prefix length may vary according to a size of a home network serviced by the RAS 400.

The response message receiving unit 412 receives a conflict/non-conflict response message including a conflict result corresponding to either conflict existence or conflict non-existence from a RAC.

The conflict/non-conflict query message transmitted from the query message transmitting unit 411, and the conflict/non-conflict response message received by the response message receiving unit 412 may be generated by using an out-of-band protocol message or a UPnP action message. The UPnP action message may be provided from RADA Sync services 323 and 371, or from another new service.

According to the conflict result included in the received conflict/non-conflict response message, the selecting unit 413 allocates the remote accessible virtual home network address to the RAS 400. In the case where the conflict result corresponds to the conflict non-existence, a mapping table entry is generated with respect to the remote accessible virtual home network address of the RAS 400 and a home network address that is allocated to a local area network (LAN) interface of the RAS 400. In consideration of multiple remote accesses, the mapping table entry includes an identifier for each remote access so that a mapping table entry for each remote access is separately maintained.

In the case where the conflict result corresponds to conflict existence, the RAS 400 re-transmits the conflict/non-conflict query message by using another remote accessible virtual home network address, and re-attempts the conflict/non-conflict query.

The converting unit 420 converts a network address by using the remote accessible virtual home network address that is generated in the mapping table entry. The converting unit 420 includes an Application Level Gateway (ALG) unit 421 and an Internet Protocol (IP) packet converting unit 422.

The ALG unit 421 converts home network addresses of various application layer protocol messages including a SSDP message into remote accessible virtual home network addresses. For example, the RAS 400 converts a network address portion of a SSDP message into the allocated remote accessible virtual home network address before the RAS 400 transmits the SSDP, which is collected by an RADA Listener, to a remote network by using an RADA Sync CP.

The IP packet converting unit 422 includes an outbound IP packet converting unit 425 and an inbound IP packet converting unit 426. The outbound IP packet converting unit 425 converts a source address of an outbound IP packet transmitted from the home network to the remote network into a network prefix that corresponds to a selected remote accessible virtual home network address. The inbound IP packet converting unit 426 converts a destination address of an inbound IP packet transmitted from the remote network to the home network into a network prefix that corresponds to the home network address allocated to the LAN interface of the RAS 400.

Figure 5:
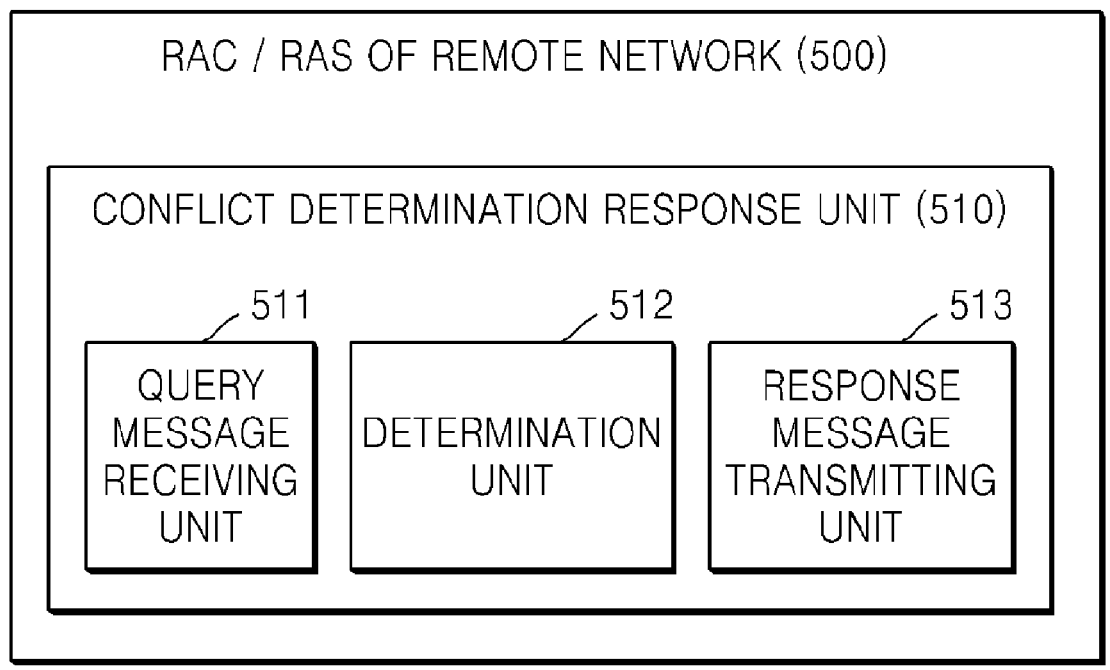
FIG. 5 is a block diagram of structures of a RAC/RAS in a remote network according to another exemplary embodiment.

FIG. 5 is a block diagram of structures of an RAC/RAS 500 in a remote network according to another embodiment. Address conflict control modules of the RAC/RAS 500 in the remote network individually include a conflict determination response unit 510. The conflict determination response unit 510 includes a query message receiving unit 511, a determination unit 512, and a response message transmitting unit 513.

The query message receiving unit 511 receives a conflict/non-conflict query message from the RAS 500. The conflict/non-conflict query message includes a network prefix and a network prefix length corresponding to a remote accessible virtual home network address serviced by the RAS 500. The determination unit 512 determines the equality of a network prefix of the remote accessible virtual home network address and a network prefix of the remote network address by comparing both network prefixes from the first bit to a shorter network prefix length bit. The shorter network prefix length is determined to be a shorter length from among the network prefix length corresponding to the remote accessible virtual home network address to be selected by the UPnP RAS, which is included in the conflict/non-conflict response message and the network prefix length corresponding to the remote network address.

The response message transmitting unit 513 transmits a conflict/non-conflict response message including a result of the determination performed by the determination unit 512 to the RAS 500.

The conflict/non-conflict query message transmitted from the query message receiving unit 511, and the conflict/non-conflict response message received by the response message transmitting unit 513 may be generated by using an out-of-band protocol message or a UPnP action message. The UPnP action message may be provided from RADA Sync services 323 and 371, or from another new service.

Meanwhile, if the result of the determination corresponds to conflict non-existence, the RAC according to the embodiment of FIG. 5 may constantly maintain the remote accessible virtual home network address that is allowed for the RAS 500, thereby preventing an address conflict between multiple networks. In the case where the result of the determination corresponds to the conflict non-existence, the RAC may further include a table entry generating unit that generates a table entry including the remote accessible virtual home network address that is allowed for the RAS 500.

Figure 6:
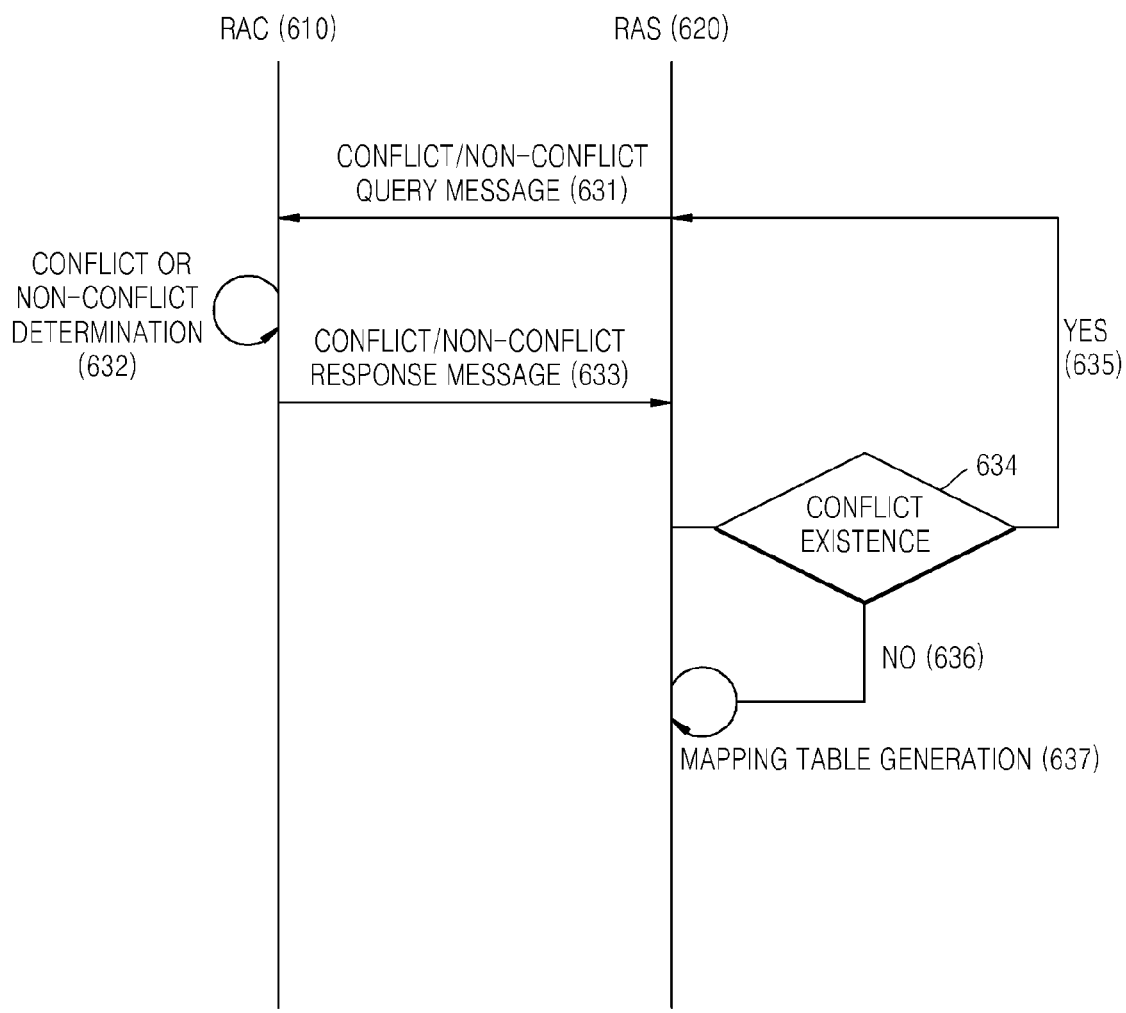
FIG. 6 is a flowchart corresponding to a communication sequence for resolving a network address conflict between a RAS and a RAC, according to an exemplary embodiment.

FIG. 6 is a flowchart corresponding to a communication sequence for resolving a network address conflict between a RAS 620 and a RAC 610, according to an embodiment. A query message transmitting unit 411 of the RAS 620 transmits a conflict/non-conflict query message to the RAC 610 (operation 631). Here, the conflict/non-conflict query message is related to whether a remote network address conflicts with a remote accessible virtual home network address to be selected by the RAS 620. The RAC 610 receives the conflict/non-conflict query message, and determines whether there is a conflict or a non-conflict situation (operation 632), thereby transmitting a conflict/non-conflict response message including a conflict result corresponding to either conflict existence or conflict non-existence to the RAS 620 (operation 633).

A response message receiving unit 412 of the RAS 620 receives the conflict/non-conflict response message and determines whether a conflict exists (operation 634). If the conflict result corresponds to the conflict non-existence (operation 636), a selecting unit 413 generates a mapping table entry with respect to the remote accessible virtual home network address of the RAS 620 and a home network address that is allocated to a LAN interface of the RAS 620 (operation 637). If the conflict result corresponds to the conflict existence (operation 635), the RAS 620 re-transmits the conflict/non-conflict query message via another remote accessible virtual home network address, and re-attempts the conflict/non-conflict query.

According to the embodiments, the conflict/non-conflict query message, and the conflict/non-conflict response message may be generated by using an out-of-band protocol message or a UPnP action message. The UPnP action message may be provided from RADA Sync services 323 and 371, or from another new service.

Figure 7:
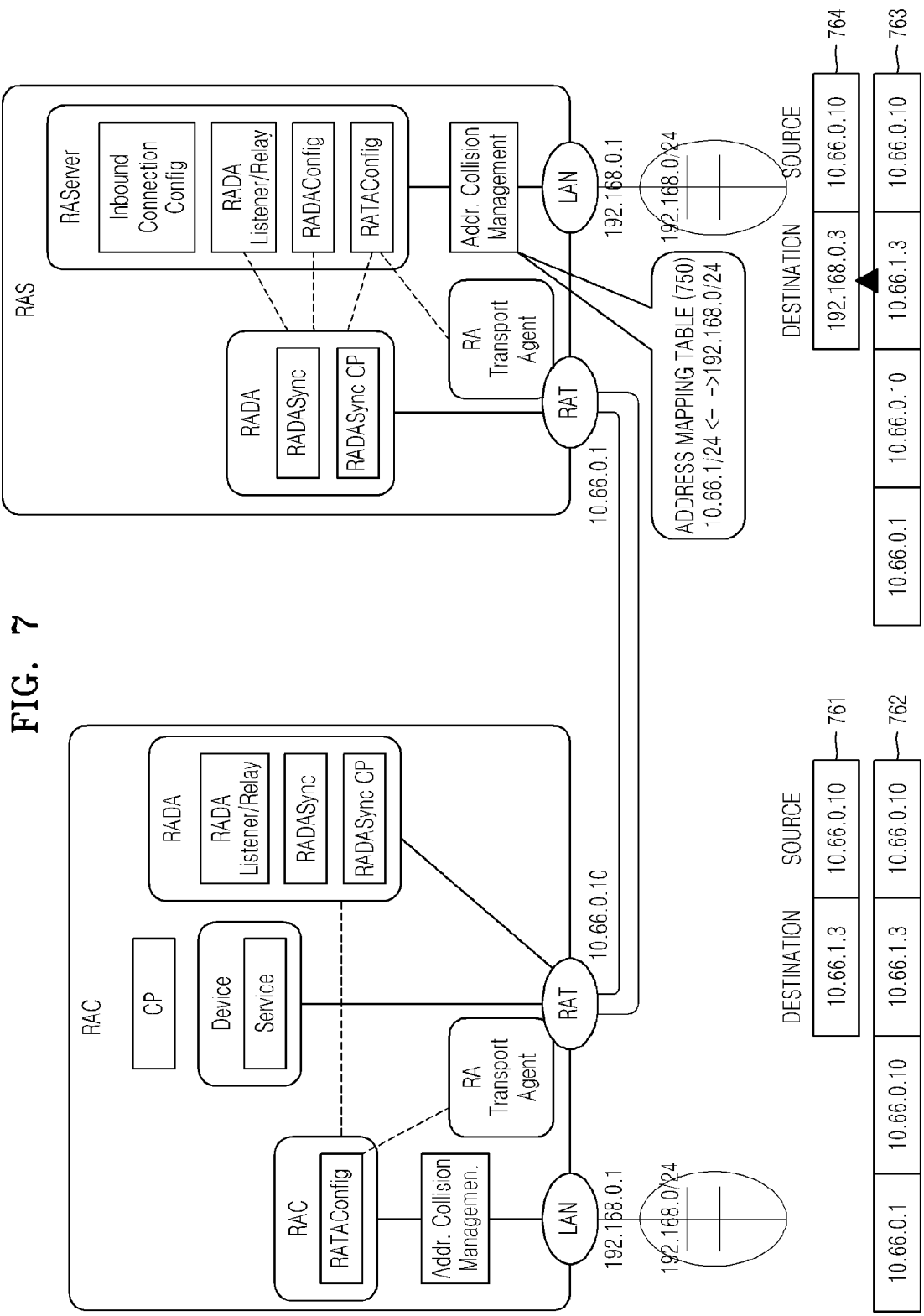
FIG. 7 is a diagram related to a method of converting an IP address of an inbound IP packet header from a RAC of a remote network to a RAS of a home network, according to an exemplary embodiment.

FIG. 7 is a diagram related to a method of converting an IP address of an inbound IP packet header from a RAC of a remote network to a RAS of a home network, according to another embodiment. The RAC receives a SSDP message from the RAS, wherein the SSDP message includes a remote accessible virtual home network address, so that the RAC remotely accesses a device in the home network by using an address having a 10.66.1.x prefix. Hereinafter, the method of converting the IP address of the inbound IP packet header will be described.

First, an IP packet is generated, wherein a source address of the IP packet is 10.66.0.10 (that is an end point of the RAC at a VPN tunnel) and a destination address of the IP packet is 10.66.1.3 (operation 761). Second, the generated IP packet is converted to a VPN packet via an RA transport agent (RATA). In a tunneling mode, IP-in-IP encapsulation is performed on the IP packet so that an IP packet header is added to the IP packet, wherein a source address of the IP packet header is 10.66.0.10 and a destination address of the IP packet header is 10.66.0.1 (operation 762). The IP packet is transmitted to the RAS. Third, the RAS receives the IP packet and decapsulates the outer IP packet header from the IP packet so that VPN tunneling is ended (operation 763). Fourth, the RAS converts the destination address of the IP packet header from 10.66.1.3 to 192.168.0.3, and then transmits the IP packet to the device in the home network (operation 764).

Conversely, although not illustrated in FIG. 7, in the case where the device in the home network transmits an IP packet to the RAC, an IP packet of which a destination address is 10.66.0.10 and of which a source address is 192.168.0.x is generated, and the RAS receives the IP packet by using a proxy Address Resolution Protocol (ARP). The RAS converts the source address of the received IP packet from 192.168.0.x to 10.66.1.x and performs IP-in-IP encapsulation on the IP packet, thereby adding an IP packet header of which the source address is 10.66.0.1, and of which the destination address is 10.66.0.10, to the IP packet. The RAC receives the encapsulated IP packet, performs VPN header decapsulation, and receives the IP packet since the RAC is a designated receiver.

According to the embodiment of FIG. 7, although a UPnP device of the remote network and a UPnP device of the home network have a same IP address due to the fact that a conflict (e.g., 192.168.0.x) exists between a network prefix of the remote network and a network prefix of the home network, the RAC may remotely access the UPnP device in the home network. Thus, the RAC may use a remote access service without converting an address and a protocol, which are obtained from the remote network.

Figure 8:
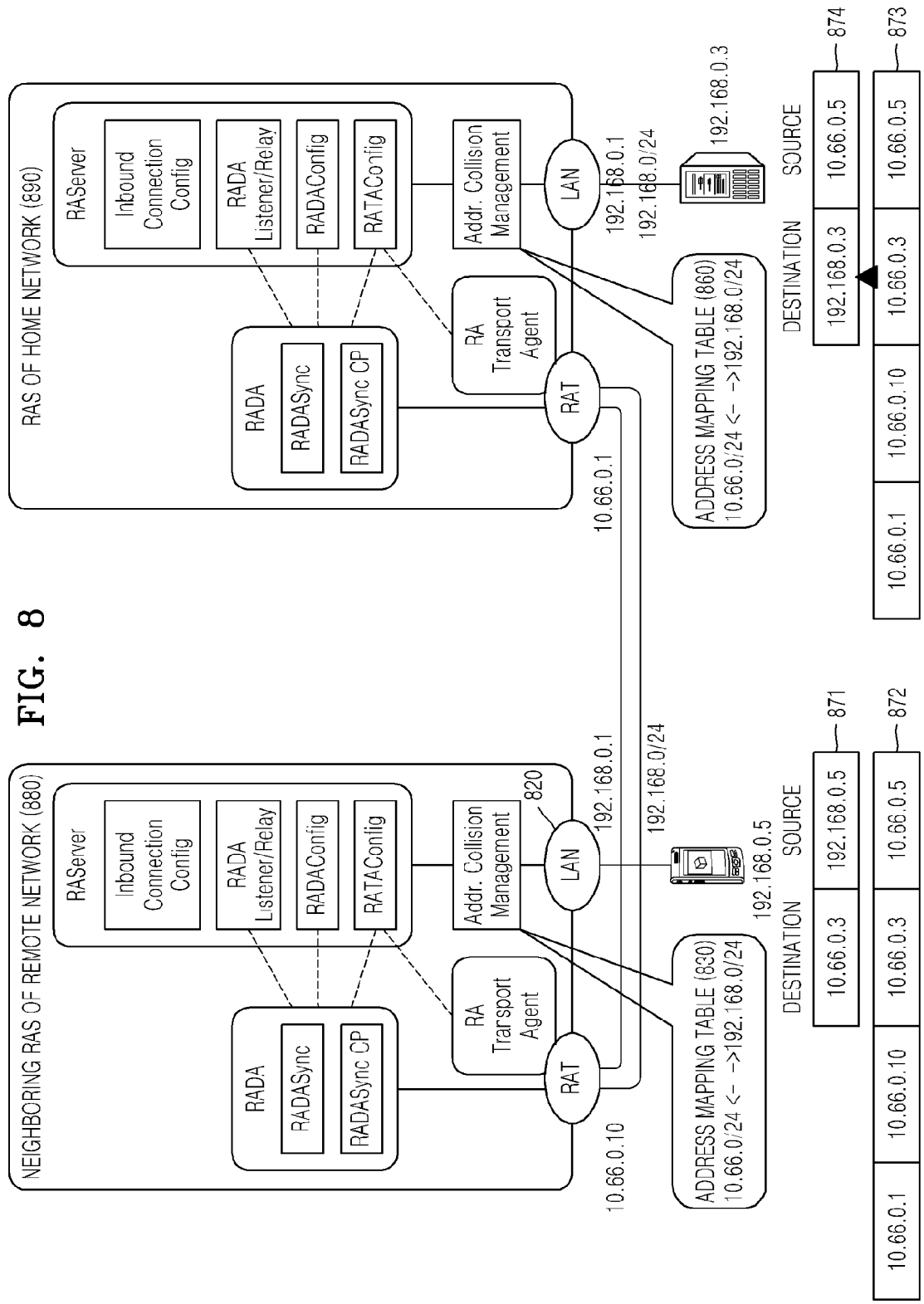
FIG. 8 is a diagram related to a method of converting an IP address of an inbound IP packet header from a RAS of a remote network to a RAS of a home network, according to another exemplary embodiment.

FIG. 8 is a diagram related to a method of converting an IP address of an inbound IP packet header from a RAS of a remote network to a RAS of a home network, according to another embodiment. FIG. 8 corresponds to a scenario in which a home network and a remote network are respectively connected to RASs via one VPN tunnel in such a manner that a remote access service is provided. In this scenario, two pairs of conflict determination procedures are necessary. In order to perform each conflict determination procedure, one RAS includes a virtual home network address selecting unit 410 and a converting unit 420, and another RAS includes a conflict determination response unit 510. For convenience of description, the RASs are referred to as a home network RAS 890 and a remote network RAS 880.

In FIG. 8, selection results 830 and 860 are shown, wherein the selection results are obtained by the home network RAS 890 and the virtual home network address selecting unit 410 of the remote network RAS 880, which respectively select a remote accessible virtual home network address so that a conflict can be avoided. That is, the remote network RAS 880 recognizes an address of a network, which is serviced by the home network RAS 890, to be 10.66.0.x. Thus, the remote network RAS 880 determines that the address of the network does not conflict with an address 192.168.0.x (refer to reference numeral 820 of FIG. 8) of a network in which the remote network RAS 880 exists, or vice versa.

The remote network RAS 880 receives a SSDP message including a remote accessible virtual home network address (10.66.0.x) so that a UPnP device serviced by the remote network RAS 880 remotely accesses a device in the home network by using an address having a 10.66.0.x prefix. Hereinafter, a method of converting an IP address of an inbound IP packet header will be described.

First, the remote network RAS 880 receives an IP packet from the UPnP device of the remote network by using a proxy ARP, wherein a source address of the IP packet is 192.168.0.5 and a destination address of the IP packet is 10.66.0.3 (operation 871). After that, the remote network RAS 880 converts the source address from 192.168.0.5 to 10.66.0.5 that is the 10.66.0.x prefix which is used in the remote access. Second, the IP packet is converted to a VPN packet via an RA transport agent (RATA). In a tunneling mode, IP-in-IP encapsulation is performed on the IP packet so that an IP packet header is added to the IP packet, wherein a source address of the IP packet header is 10.66.0.10 and a destination address of the IP packet header is 10.66.0.1 (operation 872). The IP packet is transmitted to the home network RAS 890. Third, the home network RAS 890 receives the IP packet and decapsulates the outer IP packet header from the IP packet so that VPN tunneling is ended (operation 873). Fourth, the home network RAS 890 converts the destination address of the IP packet header from 10.66.0.3 to 192.168.0.3, and then transmits the IP packet to the device in the home network (operation 874). Although not illustrated in FIG. 8, the method is the same as the case in which a device serviced by the home network RAS 890 transmits a packet to a device serviced by the remote network RAS 880.

According to the embodiment of FIG. 8, although a UPnP device of the remote network and a UPnP device of the home network have a same IP address since a conflict (e.g., 192.168.0.x) exists between a network prefix of the remote network and a network prefix of the home network, the RAS may remotely access the UPnP device in the home network. Thus, the RAS may use a remote access service without converting an address and a protocol, which are obtained from the remote network.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A communication method performed by a Universal Plug and Play (UPnP) remote access server (RAS) having an external interface to a remote network and an internal interface to a home network, the communication method comprising:
    selecting a network address prefix of a virtual address of a home network UPnP device on the home network serviced by the internal interface that is accessible by a remote UPnP device on a remote network serviced by the external interface and does not conflict with a network address prefix of the remote network;
    receiving, at the external interface of the UPnP RAS, a packet transmitted from the remote UPnP device to the home network UPnP device, the packet having the virtual address of the home network UPnP device as a destination address; and
    converting the destination address of the packet from the virtual address of the home network UPnP device to an address of the home network UPnP device on the home network and transmitting the packet to the address of home network UPnP device on the home network through the internal interface.

2. The communication method of claim 1, wherein the selecting of the network address prefix comprises:
    transmitting a conflict/non-conflict query message to the remote UPnP device, wherein the conflict/non-conflict query message requests the remote UPnP device to determine whether the network address prefix of the remote network conflicts with the network address prefix of the virtual address;
    receiving a conflict/non-conflict response message from the remote UPnP device that includes a determination of whether the network address prefix of the remote network conflicts with the network address prefix of the virtual address; and
    selecting the network address prefix of the virtual address based on the determination in the conflict/non-conflict response message received from the remote UPnP device.

3. The communication method of claim 2, wherein the conflict/non-conflict query message comprises a network prefix and a network prefix length of the virtual address.

4. The communication method of claim 2, wherein the conflict/non-conflict determination corresponds to one of a conflict existence and a conflict non-existence between the network address prefix of the remote network and the network address prefix of the virtual address.

5. The communication method of claim 2, if the conflict/non-conflict determination corresponds to a conflict non-existence, the selecting further comprises:
    generating a mapping table entry associating the network address prefix of the virtual address with a network address prefix that is allocated to the internal interface, wherein the internal interface is a local area network (LAN) interface of the UPnP RAS.

6. The communication method of claim 5, wherein the virtual address, the network address prefix that is allocated to the LAN interface of the UPnP RAS, and the network address prefix of the remote network are comprised of a network prefix and a network prefix length.

7. The communication method of claim 2, if the conflict/non-conflict determination corresponds to a conflict existence, the selecting further comprises:
    re-transmitting the conflict/non-conflict query message by using a next network address prefix of the virtual address that is different from the network address prefix of the virtual address.

8. The communication method of claim 2, wherein the conflict/non-conflict query message and the conflict/non-conflict response message are generated by using at least one of an out-of-band protocol message and a UPnP action message.

9. The communication method of claim 1, wherein the method further comprises:
    converting a home network address of a protocol message of an application layer into an address having the network address prefix of the virtual address, wherein a source address of a packet transmitted from the home network UPnP device to the remote UPnP device is converted into the network address prefix that corresponds to the virtual address.

10. A communication method performed by a remote Universal Plug and Play (UPnP) device in a remote network, the communication method comprising:
receiving a conflict/non-conflict query message from a remote access server (RAS) on a home network, the conflict/non-conflict query message requesting the remote UPnP device to determine whether a network address prefix of a virtual network address of a home network UPnP device on the home network serviced by the internal interface is accessible by the remote UPnP device serviced by an external interface of the RAS and does not conflict with a network address prefix of the remote network;
determining whether the network address prefix of the virtual network address is accessible by the remote UPnP device and does not conflict with the network address prefix of the remote network; and
transmitting to the RAS a conflict/non-conflict response message that indicates whether the network address prefix of the virtual network address conflicts with the network address prefix of the remote network.

11. A communication method performed by a Universal Plug and Play (UPnP) device in a remote network, the communication method comprising:
receiving a conflict/non-conflict query message from a remote access server (RAS) on a home network;
determining whether a virtual network address on the home network that is accessible by the UPnP device in the remote network conflicts with a network address on the remote network; and
transmitting a conflict/non-conflict response message that indicates whether the virtual network address on the home network conflicts with the network address on the remote network to the RAS,
wherein the determining comprises determining whether a network prefix of the virtual network address on the home network and a network prefix of the network address on the remote network are equal by comparing both network prefixes from the first bit to a shorter network prefix length bit, and
wherein the shorter network prefix length is determined to be a shorter length from among the network prefix length corresponding to the virtual network address on the home network to be selected by the UPnP RAS, the virtual network address on the home network to be selected by the UPnP RAS included in the conflict/non-conflict response message, and the network prefix length of the virtual network address on the home network corresponding to the network address on the remote network.

12. The communication method of claim 10, wherein the method further comprises:
if it is determined that the network address prefix of the virtual network address does not conflict with the network address prefix of the remote network, generating a table entry comprising the network address prefix of the virtual network address.

13. The communication method of claim 10, wherein the remote UPnP device is one of a UPnP remote access client (RAC) and a UPnP RAS.

14. A Universal Plug and Play (UPnP) remote access server (RAS) having an external interface to a remote network and an internal interface to a home network, the UPnP RAS comprising:
a virtual home network address selecting unit that selects a network address prefix of a virtual network address of a home network UPnP device on the home network serviced by the internal interface that is accessible by a remote UPnP device on a remote network serviced by the external interface and does not conflict with a network address prefix of the remote network;
a receiving unit that receives, at the external interface of the UPnP RAS, a packet transmitted from the remote UPnP device to the home network UPnP device, the packet having the virtual network address of the home network UPnP device as a destination address; and
a converting unit that converts the destination address of the packet from the virtual network address of the home network UPnP device to an address of the home network UPnP device on the home network and transmits the packet to the address of home network UPnP device on the home network through the internal interface.

15. The UPnP RAS of claim 14, wherein the virtual home network address selecting unit comprises:
a query message transmitting unit that transmits a conflict/non-conflict query message to the remote UPnP device, wherein the conflict/non-conflict query message requests the remote UPnP device to determine whether the network address prefix of the remote network conflicts with the network address prefix of the virtual network address;
a response message receiving unit that receives from the remote UPnP device a conflict/non-conflict response message that includes a determination of whether the network address prefix of the remote network conflicts with the network address prefix of the virtual network address; and
a selecting unit that selects the network address prefix of the virtual network address based on the determination in the conflict/non-conflict response message received from the remote UPnP device.

16. The UPnP RAS of claim 15, wherein the conflict/non-conflict query message comprises a network prefix and a network prefix length of the virtual network address.

17. The UPnP RAS of claim 15, wherein the conflict/non-conflict determination corresponds to one of a conflict existence and a conflict non-existence between the network address prefix of the remote network and the network address prefix of the virtual address.

18. The UPnP RAS of claim 15, further comprising:
a table entry generating unit that generates a mapping table entry associating the network address prefix of the virtual network address with a network address prefix that is allocated to the internal interface, if the conflict/non-conflict determination corresponds to a conflict non-existence,
wherein the internal interface is a local area network (LAN) interface of the UPnP RAS.

19. The UPnP RAS of claim 18, wherein the virtual network address, the network address prefix that is allocated to the LAN interface of the UPnP RAS, and the network address prefix of the remote network are comprised of a network prefix and a network prefix length.

20. The UPnP RAS of claim 15, wherein, if the conflict/non-conflict determination corresponds to a conflict existence, the query message transmitting unit re-transmits the conflict/non-conflict query message by using a next network address prefix of the virtual network address that is different from the network address prefix of the virtual address.

21. The UPnP RAS of claim 15, wherein the conflict/non-conflict query message and the conflict/non-conflict response message are generated by using at least one of an out-of-band protocol message and a UPnP action message.

22. The UPnP RAS of claim 14, wherein the converting unit comprises:
 an application level gateway (ALG) unit that converts an of a protocol message of an application layer into an address having the network address prefix of the virtual network address; and
 an IP packet converting unit, the IP packet converting unit comprising:
  an outbound IP packet converting unit that converts a source address of an IP packet transmitted from the home network UPnP device through the internal interface to the remote UPnP device into the network address prefix of the virtual network address on the external interface; and
  an inbound IP packet converting unit that converts the destination address of the packet from the virtual address of the home network UPnP device to the address of the home network UPnP device on the home network and transmits the packet to the address of home network UPnP device on the home network through the internal interface.

23. A remote UPnP device in a remote network, the remote UPnP device comprising:
 a query message receiving unit that receives a conflict/non-conflict query message from a remote access server (RAS) in a home network, the conflict/non-conflict query message requesting the remote UPnP device to determine whether a network address prefix of a virtual network address of a home network UPnP device on the home network serviced by the internal interface is accessible by the remote UPnP device serviced by an external interface of the RAS and does not conflict with a network address prefix of the remote network;
 a determination unit that determines whether the network address prefix of the virtual network address is accessible by the remote UPnP device and does not conflict with a network address prefix of the remote network; and
 a response message transmitting unit that transmits to the RAS a conflict/non-conflict response message that indicates whether the network address prefix of the virtual network address conflicts with the network address prefix of the remote network.

24. A UPnP device in a remote network, the UPnP device comprising:
 a query message receiving unit that receives a conflict/non-conflict query message from a RAS in a home network;
 a determination unit that determines whether a virtual network address on the home network that is accessible by the UPnP device conflicts with a network address on the remote network; and
 a response message transmitting unit that transmits a conflict/non-conflict response message that indicates whether the virtual network address on the home network conflicts with the network address on the remote network to the RAS,
 wherein the determination unit determines whether a network prefix of the virtual network address on the home network and a network prefix of the network address on the remote network are equal by comparing both network prefixes from the first bit to a shorter network prefix length bit, and
 wherein the shorter network prefix length is determined to be a shorter length from among the network prefix length corresponding to the virtual network address on the home network to be selected by the UPnP RAS, the virtual network address on the home network to be selected by the UPnP RAS included in the conflict/non-conflict response message, and the network prefix length of the virtual network address on the home network corresponding to the network address on the remote network.

25. The UPnP device of claim 23, further comprising a table entry generating unit that generates a mapping table entry comprising the network address prefix of the virtual network address.

26. The UPnP device of claim 23, wherein the remote UPnP device in the remote network is one of a UPnP remote access client (RAC) and a UPnP RAS.

27. A non-transitory computer readable recording medium having recorded thereon a program for causing a computer to execute the method of claim 1.

28. A non-transitory computer readable recording medium having recorded thereon a program for causing a computer to execute the method of claim 10.

* * * * *